(12) United States Patent
Pfeifer et al.

(10) Patent No.: US 6,186,164 B1
(45) Date of Patent: Feb. 13, 2001

(54) ROTARY VALVE COMPRISING A DRAWING DEVICE

(75) Inventors: Kurt Pfeifer, Salem-Beuren; Ewald Könlg, Zussdorf; Klaus Hemmelmann, Illmensee, all of (DE)

(73) Assignee: Waeschle GmbH, Weingarten (DE)

( * ) Notice: Under 35 U.S.C. 154(b), the term of this patent shall be extended for 0 days.

(21) Appl. No.: 09/447,355

(22) Filed: Nov. 22, 1999

(30) Foreign Application Priority Data

Nov. 27, 1998 (DE) ............................................. 198 54 785

(51) Int. Cl.⁷ .................................................. F16K 43/00
(52) U.S. Cl. .............. 137/315.41; 137/315.17; 137/315.25; 29/213.1; 29/221.6
(58) Field of Search ................ 137/315.18, 315.21, 137/315.25, 315.26, 315.41, 15.17, 15.18; 29/213.1, 221.6

(56) References Cited

U.S. PATENT DOCUMENTS

| | | | |
|---|---|---|---|
| 4,875,523 | * 10/1989 | Thornburrow | 137/315.41 X |
| 4,917,141 | * 4/1990 | Brunnel et al. | 137/315.26 |
| 5,129,417 | * 7/1992 | Dupont et al. | 137/315.26 |
| 5,529,087 | * 6/1996 | Berry et al. | 137/315.41 |
| 5,975,104 | * 11/1999 | Wilkins | 137/315.41 X |

FOREIGN PATENT DOCUMENTS

| | | |
|---|---|---|
| 3818145 | 11/1989 | (DE) . |
| 4135395 | 4/1993 | (DE) . |

\* cited by examiner

*Primary Examiner*—Kevin Lee
(74) *Attorney, Agent, or Firm*—Burns, Doane, Swecker & Mathis, LLP

(57) ABSTRACT

A rotary valve includes a housing having a housing bore which can be laterally closed by bearing covers. Inside the housing, a cellular wheel is rotatably supported. A guiding device extends in an axial direction of the cellular wheel and serves for drawing the cellular wheel in the direction of its axis of rotation out of the housing bore. This guiding device includes an additional bearing which can be displaceable in the axial direction relative to that bearing cover which is on the guiding side. The additional bearing serves to support the cellular wheel temporarily during removal from the housing bore. This additional bearing can be connected to that end of a cellular wheel shaft which is situated at the side of the guiding device.

14 Claims, 3 Drawing Sheets

ROTARY VALVE COMPRISING A DRAWING DEVICE

BACKGROUND OF THE INVENTION

Field of the Invention

The invention relates to a rotary valve which comprises a housing surrounding a housing bore open at at least one end, thus forming an opening. This opening is normally closed by at least one removable bearing cover on one side while the other end of the housing bore may be closed either by another bearing cover or some other wall. The bearing cover includes a first bearing. Within the housing bore, a cellular wheel is supported by the first bearing and is, thus, rotatable about an axis of rotation. The cellular wheel includes series of web plates arranged to extend radially in a star-shape on a hub. This cellular wheel can be dismantled and drawn out of the housing bore in axial direction so that the orientation of the axis of rotation defines a dismantling direction. A drawing device is mounted on the side of the removable bearing cover for aiding in dismantling the cellular wheel and comprises a guiding device which extends in a dismantling direction and, thus enables guided dismantling of the cellular wheel in an axial direction out of the housing bore.

BACKGROUND INFORMATION

Rotary valves of this kind are usually used for conveying or metering bulk material from a supply bin into a pneumatic conveying conduit. At the occasion of periodic maintenance and repair as well as for the purpose of cleaning the valve, for example when changing the type of bulk material to be conveyed, it may be necessary to remove the cellular wheel from the housing bore. However, there is only a small and narrow gap between the cellular wheel and the inner surface of the housing bore in order to achieve good sealing properties in radial direction. Therefore, removal and re-insertion of the cellular wheel require much care so that the inner wall of the housing bore is not damaged by the web plates of the cellular wheel.

In the case of small rotary valves, the cellular wheel can, in some cases, be removed manually. Rotary valves which comprise heavy cellular wheels, however, are often provided with a drawing device which facilitates drawing the cellular wheel out of the housing bore.

Such a rotary valve is disclosed in German Patent No. DE 38 18 145. The cellular wheel has shaft ends or stub shafts at the opposite front surfaces and is supported by bearing covers closing the housing bore. On one side of the housing, a guidance is provided which extends in an axial direction and comprises a pair of guide columns connected to the housing and a carriage displaceable on and along them, the carriage being screwed together with that one of the bearing covers which is arranged at the side of the guide columns.

Thus, the cellular wheel can be displaced together with the bearing cover including the fast bearing at the side of the guide columns along its middle axis of rotation in the direction of the guide columns or dismantling direction thereby drawing that stub shaft which is opposite the side of the guide columns, out of the slip-on bearing provided in an opposite bearing cover.

Such a rotary valve is able to prevent any undesirable canting of the cellular wheel up to a certain weight of it. With very heavy cellular wheels, however, a single fast bearing is not able to bear the weight of the cellular wheel. Of course, the same would apply, if the cellular wheel were provided with a rim for supporting it on the outer circumference of the rim instead of providing stub shafts or any shaft.

In order to avoid canting, German Patent Application DE 41 35 395 A1 suggests to arrange a pair of spaced bearings in each one of the bearing covers so that a cellular wheel may be supported in a "flying" manner by two bearings when drawn out of the bearings of the opposite bearing cover.

This measure, however, due to redundancy in determination, leads in operation of the valve to permanent bending stress of the cellular wheel's shaft if there is only a small deviation from precise alignment, thus resulting in an increased drive moment, and to fatigue fracture.

SUMMARY OF THE INVENTION

It is an object of the present invention to develop the design according to the prior art further in such a way that any overstrain of the components of a rotary valve are reliably prevented both in operation and when cleaning or repairing it.

This object is achieved in that the guidance includes an additional supporting arrangement which engages and supports the cellular wheel at least temporarily during dismantling. This supporting arrangement can be formed by a simple fork or other surface by which the cellular wheel is supported during dismantling either by the rim mentioned above or, by at least one shaft having two ends (or a pair of opposite stub shafts). In the latter case, it is preferred if one end of the shaft engages the bearing on the side of the guidance, while the additional support may be connected to this shaft end.

Of course, particularly when using a single shaft that extends over the whole axial length of the cellular wheel, it would be possible to shift the shaft through or over the support device or the bearing forming it. However, it is preferred if the support device is displaceable in dismantling direction relative to the bearing cover. In this way, both the support device and the cellular wheel can be moved together without causing too much relative movement between them.

It has been mentioned above that canting of the cellular wheel is to be avoided. As long as the cellular wheel's opposite shaft end has not yet been drawn out of the slip-on bearing while the shaft end or the cellular wheel engages the additional support provided according to the present invention, there is again some redundancy which can cause the risk of canting during dismantling. In order to adapt the additional support to the level of the cellular wheel, and the shaft end to be supported, it is desirable if there is some arrangement which enables displacing the additional support transversely to the dismantling direction in order to vary and match the position or level of the cellular wheel when the latter is to engage the additional support.

Since the risk of canting exists especially in a vertical direction due to the weight of the cellular wheel whose axis of rotation will normally extend in a horizontal direction, the additional support is preferably displaceable in a vertical direction by the respective displacing device.

Such displacing device can be formed by a positive drive, such as a screwed spindle, to vary the position of the additional support. However, it is simpler in construction and handling if the displacing device comprises resilient means, such as a pressure spring.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Figure 1:
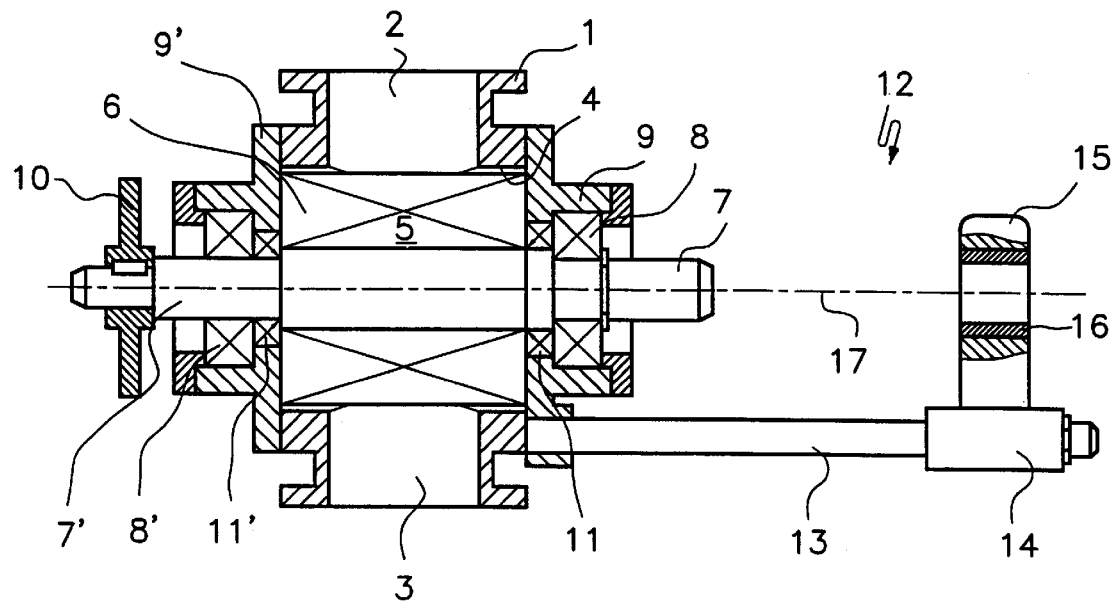
FIG. 1 is an axial cross-sectional view of a rotary valve according to an exemplary embodiment of the invention when in operative condition.

A rotary valve, as shown in FIG. 1, comprises a housing 1 having a supply opening 2 and a discharge opening 3 for bulk material. A cellular wheel 6 which comprises a series of web plates 5 arranged to extend radially in a star-shape on a hub is rotatably supported within a housing bore 4 by two stub shafts or shaft ends 7 and 7'.

The shaft end 7 is supported by a roller bearing 8 formed as a fast bearing in an assigned bearing cover 9, while the opposite shaft end 7' is supported by another roller bearing formed as a slip-on bearing 8' in another bearing cover 9'. A drive moment for the cellular wheel 6 is applied via the shaft end 7' at the side of the slip-on bearing 8' and a removable pinion 10. Sealing elements 11 and 11' prevent dust from the bulk material to enter the roller bearings 8 and 8'.

A guiding arrangement 12 including axially extending guide columns 13 is attached to the housing 1. The bearing cover 9, on the one hand, as well as a carriage 14 moveable independently from the latter, on the other hand, can be displaced on the guide columns 13 in a direction parallel to the center axis of the cellular wheel 6 which direction, thus, forms a dismantling direction. The carriage 14 comprises a bearing pedestal 15 in or on which a support device which, in the embodiment shown is a friction bearing 16, is located. Since the extended shaft end that projects from the fast bearing 8 is to be additionally supported, it would, in principle, be sufficient to provide a supporting surface on top of a shorter pedestal 15 and below the shaft end 7. Such supporting surface could be formed V-shaped or in a half-circular shape to provide a centering action onto the shaft end 7 in alignment with the geometrical axis 17. However, a bearing fully surrounding and embracing the shaft end 7, as depicted, is preferred, because it enables even rotating the cellular wheel if necessary when repairing or maintaining.

In operation, the cellular wheel 6 is supported exclusively by the combination of the slip-on bearing 8' and the fast bearing 8, as mentioned above. Any small deviation from alignment between the two roller bearings 8' and 8 may normally be compensated by the natural bearing play.

Figure 2:
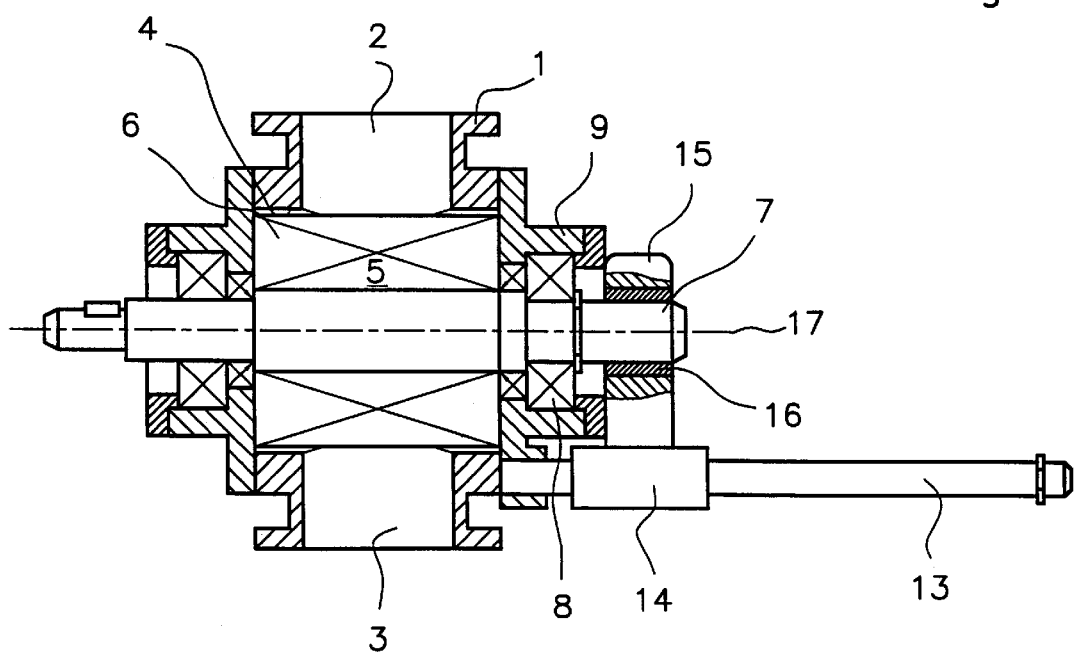
FIG. 2 is a similar cross-sectional view of the rotary valve according to FIG. 1, but in ready condition for drawing the cellular wheel out of the housing.

FIG. 2 shows the same rotary valve when preparing for drawing out the cellular wheel 6. The pinion 10 (FIG. 1) has been removed from the shaft end 7'. At the opposite side, the side of the guidance 13 to 17, the carriage 14 has approached the housing 1 so that the support or bearing 16 embraces the shaft end 7. Any screw (not shown) that connected the bearing cover 9 to the housing has been screwed out.

Figure 3:
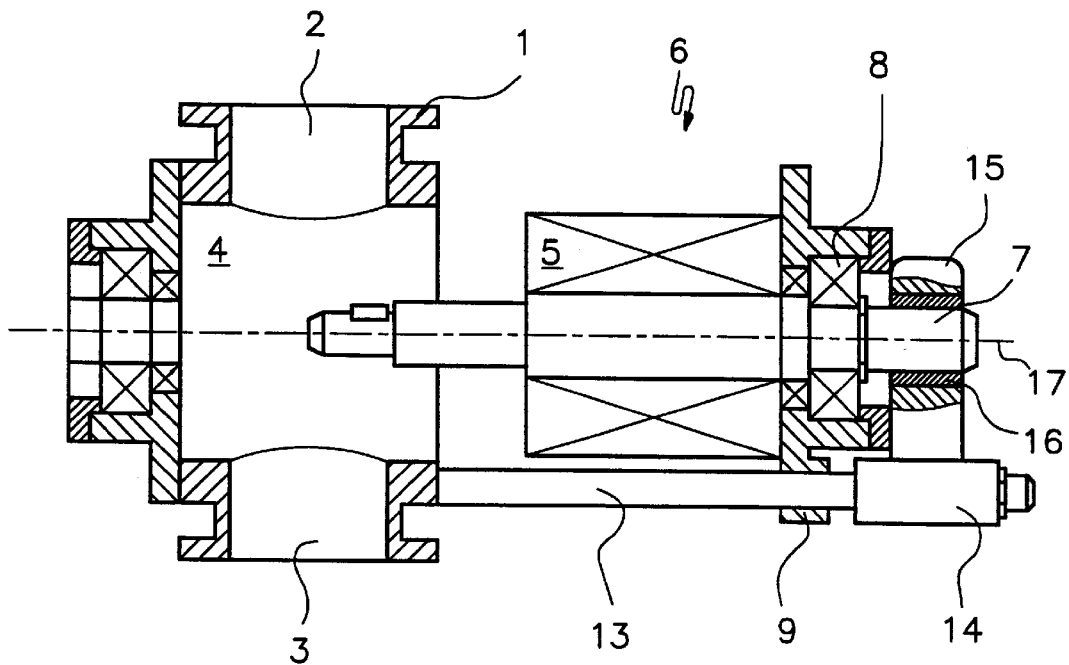
FIG. 3 is a similar cross-sectional view of the rotary valve according to FIG. 1, but with the cellular wheel drawn out of the housing for cleaning, maintenance and/or repair.

The cellular wheel 6 can be drawn out of the housing bore 4 in the direction of its center axis 17 (dismantling direction), as shown in FIG. 3. The extended shaft end, which can protrude by a certain length depending on the weight of the cellular wheel 6, this length being, for example in a range from ⅓ to ⅔, (e.g. ½), of the axial length of the cellular wheel, is then supported both by the roller bearing 8 and the additional bearing 16 which is appropriately spaced from the bearing 8 so that any undesirable canting of the cellular wheel 6 in the housing bore 4 is avoided. In some cases, the pedestal 15 can be temporarily connected to the bearing cover 9 in a positive manner so as to prevent slipping of the shaft end 7 out of the additional bearing 16. Such connection can be done in any way desirable, for example by screwing, bolting or providing a bayonet-type fitting.

As mentioned above, the fact that the friction bearing 16 embraces and surrounds the shaft end 7 keeps the cellular wheel 6 rotatable even when drawn out of the housing bore 4, thus facilitating considerably cleaning the web plates 5. Re-insertion of the cellular wheel 6 into the housing bore 4 is done in reverse order.

Figure 4:
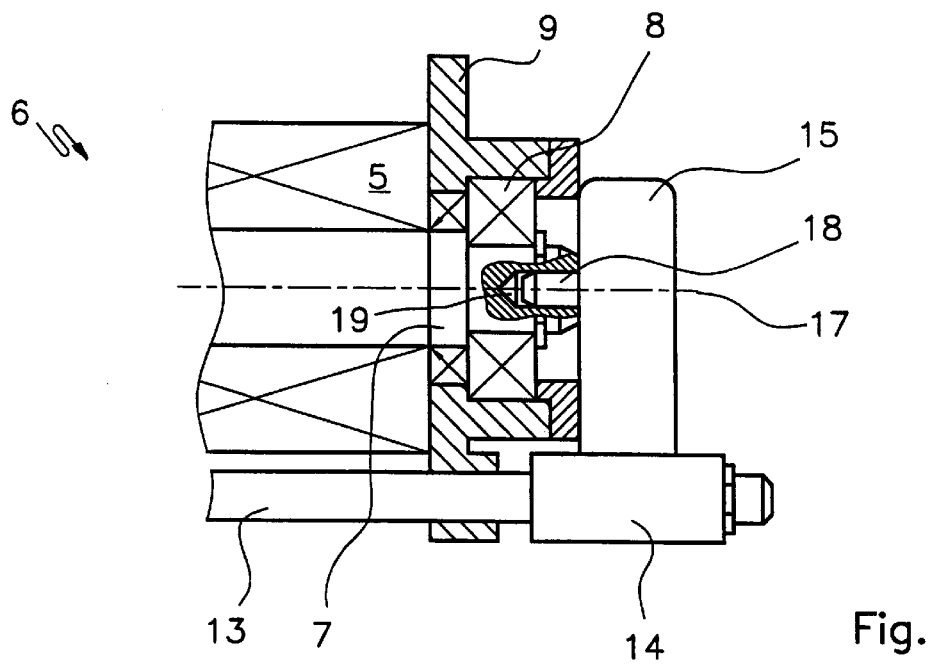
FIG. 4 is an enlarged cross-sectional detail of another exemplary embodiment of the present invention.

FIG. 4 shows an embodiment of a rotary valve which is modified with respect to the embodiment described above in that an axle or journal 18 can be inserted into a recess 19 of the shaft 7 which extends in longitudinal direction of the center axis 17 so that it supports the cellular wheel 6 when the latter is drawn out of the housing bore 4. It is to be understood that this design allows rotation of the wheel as to maintain the advantage mentioned above. Alternatively, the recess can be arranged laterally on the circumferential surface of the shaft 7 merely to support it without rendering it rotatable.

Figure 5:
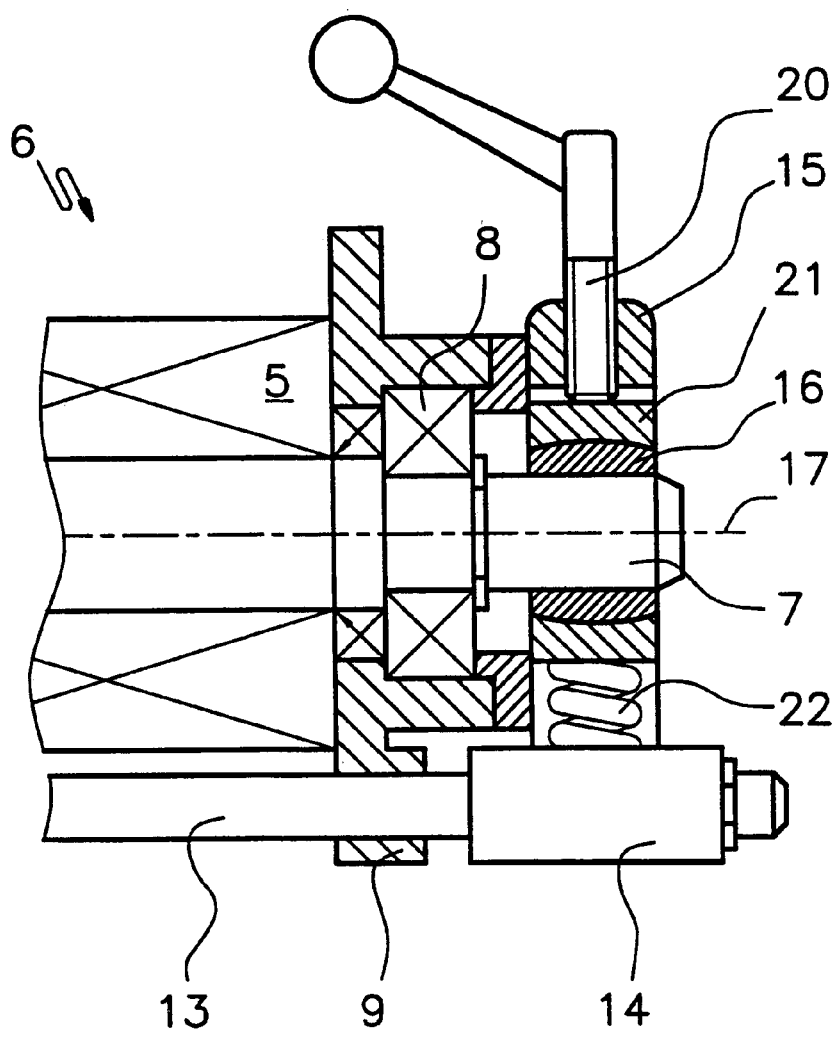
FIG. 5 is an enlarged cross-sectional detail of yet a further exemplary embodiment of the present invention.

If the cellular wheel 6 has been removed completely from the housing 1 and not merely partially, re-insertion can include an ability to adjust its position relative to the housing bore 4. To this end, the pedestal 15 according to FIG. 5 comprises a slider 21 as a shell for the bearing 16 and a threaded spindle 20. The end of this spindle 20 can be connected to the slider 21 in a rotatable, but axially fixed manner so that the slider together with the bearing 16 is positively displaced. However, according to the embodiment shown in FIG. 5, there is a pressure spring 22 which biases the slider 21 up against the front surface of the spindle 20. This front surface acts as an abutment surface for the slider 21. This design enables an easier self-adjustment of the cellular wheel 6 when inserted into the housing bore 4. The slider 21 and the bearing 16 are adjusted by rotating the spindle 20 to raise or lower its front end surface in a vertical direction (or in any direction desired according to the axial orientation of the spindle 20, though a vertical orientation is preferred) so that the cellular wheel 6 can be raised or lowered itself and can be precisely inserted into the housing bore 4. Alternatively, a spring 22 or any other resilient arrangement, such as an elastic pad, could be provided alone, thus omitting the spindle 20, in which case the bearing 16 would have to be pressed manually down to align the axis of the cellular wheel 6 with that of the housing bore 4.

In any case, this displacement or adjustment device is basically adapted to compensate for any play of the fast bearing 8 and/or the additional bearing 16 which could cause canting of the cellular wheel 6 within the housing bore 4. However, use of this device can even be convenient if complete removal of the cellular wheel 6 from the housing bore 4 is not intended.

The present invention is not restricted to the embodiments shown, but encompasses all modifications made by one skilled in the art without any inventive step. In particular, it will be understood that the guidance does not necessarily comprise the guide columns 13 and friction bearings 9, 14 thereon, but could be formed as a dove-tail guidance and/or roller guidance or in any other design. Instead of a friction bearing, any other bearing could be used such as a roller bearing or a needle bearing, particularly for supporting the shaft 7 of the cellular wheel 6. Similarly, the cellular wheel 6 does not necessarily require use of a roller bearing 8 or 8', but can have at least one friction bearing. The shape of the cellular wheel 6 can be varied, and can even be non-cylindrical (e.g. can be conical over its length or can be spherical). Displacing the additional bearing 16 in transverse direction to the axis 17 can also be done by any other means (e.g. using an eccentric or a cam).

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A rotary valve comprising
   a housing surrounding a housing bore open at at least one end, thus forming an opening;
   at least one removable bearing cover for closing said opening, said bearing cover including first bearing means;
   a cellular wheel supported rotatably about an axis of rotation within said housing bore by said first bearing means, the orientation of said axis of rotation defining a dismantling direction;
   guide means extending in said dismantling direction at a side of said opening for guided dismantling of said cellular wheel in an axial direction of said axis of rotation out of said housing bore, said guide means including support means for engaging and supporting said cellular wheel at least temporarily during dismantling.

2. Rotary valve as claimed in claim 1, wherein said support means are displaceable in said dismantling direction relative to said bearing cover.

3. Rotary valve as claimed in claim 1, wherein said cellular wheel comprises at least one shaft having two ends, one of said ends engaging said first bearing means, said support means being connectable with said one end.

4. Rotary valve as claimed in claim 3, wherein said support means are shiftable in said dismantling direction onto said one end.

5. Rotary valve as claimed in claim 3, wherein said one end comprises a recess, said support means being shiftable to engage said recess.

6. Rotary valve as claimed in claim 5, wherein said cellular wheel has a central shaft, said recess extending in said axial direction in said one end of said shaft, while said support means comprise axle means.

7. Rotary valve as claimed in claim 1, further comprising displacing means for displacing said support means transversely to said dismantling direction for varying the position of said cellular wheel when the latter engages said support means.

8. Rotary valve as claimed in claim 7, wherein said axis of rotation extends horizontally, said support means being displaceable in a vertical direction by said displacing means.

9. Rotary valve as claimed in claim 7, wherein said displacing means have two ends, one of said ends being supported by said guide means, and another of said ends holding said support means.

10. Rotary valve as claimed in claim 7, wherein displacing means comprise resilient means.

11. Rotary valve as claimed in claim 10, wherein said resilient means comprise a pressure spring.

12. Rotary valve as claimed in claim 7, wherein said displacing means comprise a threaded spindle.

13. Rotary valve as claimed in claim 12, wherein said spindle comprises an abutment surface engaging one side of said support means, said rotary valve further comprising resilient means pressing said support means against said abutment surface.

14. Rotary valve as claimed in claim 1, wherein said cellular wheel comprises at least one shaft having two ends, and said support means comprise second bearing means to engage one of said two ends and surround it.

* * * * *